Sept. 8, 1925.

V. G. APPLE 1,552,661

COMBINED LIGHT AND WATER PLANT

Filed Sept. 15, 1919

Inventor
Vincent G. Apple
Jones Bain & Hinkle
Attys.

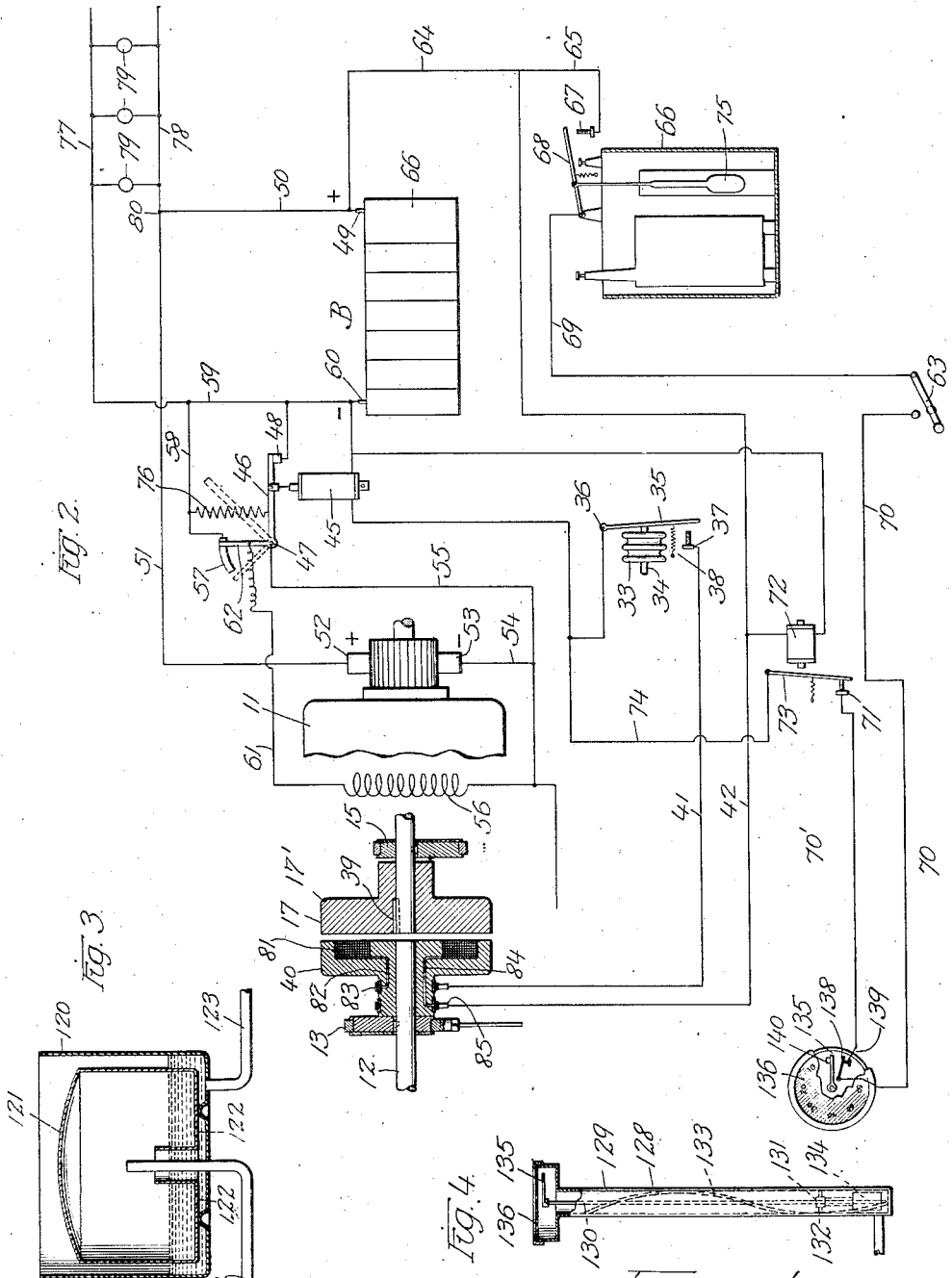

Patented Sept. 8, 1925.

1,552,661

UNITED STATES PATENT OFFICE.

VINCENT G. APPLE, OF DAYTON, OHIO.

COMBINED LIGHT AND WATER PLANT.

Application filed September 15, 1919. Serial No. 324,021.

*To all whom it may concern:*

Be it known that I, VINCENT G. APPLE, a citizen of the United States, residing at Dayton, in the county of Montgomery and State of Ohio, have invented certain new and useful Improvements in Combined Light and Water Plants, of which the following is a specification.

The invention relates to a method of and apparatus for automatically supplying electric lights, hot and cold water, and for utilizing the waste heat of an internal combustion engine, to contribute in maintaining the water at the desired temperature, thus serving dual purpose of mainaining the engine at proper temperature for automatic starting, in winter and summer, with heavy fuels, besides furnishing hot water for domestic purposes.

Another object of the invention is to provide a plant that will automatically start and stop a pump or pumps for furnishing a water supply between predetermined ranges of pressure and temperature; which will produce a distinctive alarm signal, or will automatically stop the engine when the supply of fuel or lubricant is about exhausted and which will control a fuel supply, to supplement the waste heat of the engine, for maintaining the water at the desired temperature when the heat from the engine is not sufficient for the purpose, and furthermore which will automatically stop the engine when the voltage of the battery is up to its usual potential difference, and when the battery electrolyte has reached a predetermined density.

Other and more specific objects of the invention will be readily apparent, to a person skilled in the art, from a consideration of the following description, when taken in conjunction with the drawings, wherein—

Fig. 1 shows a schematic arrangement of the apparatus necessary for carrying the invention into effect.

Fig. 2 is a more specific diagram with reference to the particular character of the apparatus used, showing some of the apparatus in more detail and omitting to show other parts, that are familiar, and which are shown in outline in Fig. 1.

Fig. 3 is a section of a fluid level controller, used in connection with supplying the lubricating oil to the engine and associated apparatus.

Fig. 4 is an indicator showing the quantity of fuel or lubrication in the receptacle in which such material is kept, and showing the means of controlling an electric circuit at or about the time the supply becomes exhausted. This also prevents cranking the engine, thus losing battery charge.

In all the views the same reference characters are used to indicate similar parts.

10 is an internal combustion engine, driving a dynamo electric machine, or generator 11.

Normally loose on the shaft 12, of the engine, is an eccentric 13, for driving the cold water pump 14; and another eccentric 15, is fixed thereon and used for driving the hot water pump 16. An electric clutch 17 controls the eccentric 13 and the cold water supply; 18 is a cold water tank and 19 is a hot water tank. When the eccentric 13 is connected to the shaft 12 by the electric clutch 17 it operates the pump 14, to take the cold water from the deep well or cistern 20, thru the pipe 21, and pump it thru the pipe 22 into the tank 18. The service supply is taken from the tank thru pipe 23. The hot water pump 16 takes water from the tank 19, thru the pipes 24 and 25 and delivers it into the water jacket of the engine 10 by the pipe 26. The hot water is taken from the water jacket by the pipe 27 and delivered into a valve casing 28, from which it may pass thru pipe 29 into the hot water tank 19, or when heated excessively into the pipe 30, and to an outside radiator 31, or any other source through which it may be directed while being cooled, and returns to the pipe 25 through the pipe 32. The hot water pump 16 is operated positively by the shaft 12, and is always in operation when the engine is in service, but the pump 14, which supplies the cold water, is in service only when the electric clutch 17 is properly energized. Connected to the upper end of the cold water tank 18 is a bellows diaphragm, or sylphon 33, connected thereto by pipe 34. The diaphragm 33 controls a lever 35, pivoted as at 36. The lower end of the lever 35 is adapted to make electrical connection with a contact screw 37, being normally held in contact therewith by the spring 38, when not forced away by the bellows diaphragm 33. This is more clearly shown in Fig. 2.

Now when the pressure of the water within the tank 18 is beyond a predetermined degree, the bellows diaphragm 33 pushes the arm 35 out of its connection with the contact screw 37, thereby opening the circuit in the clutch 17, and stopping the operation of the pump. The clutch member 17', of the clutch 17, is rotatably connected to the shaft 12 by a feather 39, but it is free to move axially on the shaft when attracted by the member 40, when the latter is electrically energized. The clutch is energized by the battery B, over the wires 41 and 42 through a circuit that can be easily traced, and to which reference will be hereinafter more fully made.

A starting coil 45, when energized, connects the battery B with a dynamo 11 initially to start the engine. It controls a lever 46, pivoted at 47, and adapted to make electrical connection with a contact 48. When this connection is made the current will pass from the positive terminal 49 of the battery B, over the wires 50 and 51 to the positive brush 52 of the dynamo, and thence thru the dynamo to the negative brush 53, and over the wires 54 and 55, and thence over the arm 46 and contact 48, thus causing the dynamo 11 to operate as an electric motor to start the engine. The circuit is closed thru the field coils 56 of the dynamo, just prior to closing the circuit thru the armature. A segment 57 is connected by wire 58 to the wire 59, which in turn is connected to negative terminal 60 of the battery. The wire 61 is connected to one end of the field windings 56, and to a lever 62, that is insulated from, but moves with the lever 46. The lever 62 makes contact with the segment 57 before the lever 46 makes electrical connection with the contact 48, and therefore the field circuit is closed before the armature circuit is closed. The starting magnet 45 may be energized from a remote point by a manual switch 63 and when closed the engine will also start with low water pressure, and by this means the battery will be given an occasional overcharge, which is a desirable feature. When the hand switch 63 is closed the circuit will proceed over the wires 64 and 65, and thru a switch operated by the hydrometer 75 in the controlling cell 66 of the battery, and thru the contact 67, and lever 68, thereof, wires 69 and 70, thru the contact 71, controlled by the potential electromagnet 72, and the lever 73, and thence by wire 74 back to the controlling magnet 45. This circuit may be opened automatically by the controlling cell 66, when the density of the liquid electrolyte is sufficient to indicate that the battery B is fully charged. Therefore, it will be unnecessary to start the engine to supply the light, because so long as the density indicator, consisting of the hydrometer 75, raises the switch arm 68 and opens the circuit, the battery is sufficiently well charged to take care of all of its load. The potential magnet 72 is connected directly across the terminals of the battery B, and when the electro-motive-force is sufficiently high the magnet 72 attracts the lever 73, and opens the circuit between 73 and 71, so that the engine may not be started, by closing the manual switch 63, because in that event it will be unnecessary, and therefore it is manifest that when the electro-motive-force of the battery is sufficiently high to supply current for the load, or when the specific gravity of its electrolyte is proper, the dynamo may not be started from the remote point, such as the switch 63, and can only be started from this point when the potential of the circuit is sufficiently low to need recharging of the battery, or when the specific gravity is low, on account of the battery being partially discharged or when water pressure in tank 18 is low.

Assuming the switch 63 to be closed, and the engine and dynamo being in operation, just so soon as the electro-motive-force, or voltage of the battery, has reached the predetermined point, the electromagnet 72 will attract the armature 73 and open the circuit between the armature, or lever 73, and the contact 71, thereby permitting the spring 76 to overcome the magnetism in the starting magnet 45, and opening the circuit between the battery and the dynamo. It will not be necessary to run the engine and dynamo uselessly after the battery has been fully charged and its electrolyte is of proper density, except occasionally to pump water pressure which will give the battery the occasional overcharge needed. As heretofore explained, either the density, or variation in density of the electrolyte and the variation in the electro-motive-force, or voltage of the current supplied by the battery, or the lack of oil or fuel for the engine or low pressure in tank 18 initiate the means by which the engine may be started or stopped, as required for the service.

The battery terminals 49 and 60, are connected to electric light service wires 77 and 78, by the wires 50 and 59, respectively, to supply electric lights. The positive brush 52 of the dynamo is connected to the wire 51 and that wire is connected at the junction of the wires 50 and 78, as at 80, while the negative brush 53 is connected by the wires 54 and 55 and the lever 46 to the negative terminal of the battery, thru the wire 59, so that the dynamo and the battery are in parallel circuit for supplying the current for the lamps 79.

The clutch 40, for controlling the cold water pump 14, is provided with an electric coil 81, connected by wire 82 to an insulated ring 83, the other end of the coil being connected by wire 84 to a ring 85, and these rings are connected to the wires 41 and 42 for communicating current to the clutch to energize it, in order that the eccentric 13, driving the cold water pump, may be rotated. The engine will be automatically started each time water pressure is low. This is effected by the switch lever 35 touching contact 37, whereupon circuit will be established thru the clutch 40 and starting coil 45. When the pressure in tank 18 is sufficient to separate contacts 35 and 37, the clutch will be deenergized but the starting magnet may remain energized if the circuit thru the devices 136, 72 and 75 is closed and the engine will not be stopped when the cold water pump is disconnected from the engine.

Connected to the hot water tank 19 is a bellows diaphragm, or sylphon 90, controlling a lever 91, which is pivoted, as at 92. A pipe 93 connects the diaphragm to the tank and maintain the diaphragm filled with hot water from the tank. When the water in the tank has reached a predetermined temperature the diaphragm 90 is expanded, thereby causing its armature arm 91 to make electrical connection with a contact 95, which causes energization of the electromagnet 96, thru the wires 97 and 98, that are connected to the main wires 77 and 78. Thus it will be seen that the diaphragm and the switch lever 91 are positively operated by the increased pressure created by the rise in water temperature. When the magnet 96 is energized it pulls over the arm 99 and closes the end of the pipe 100 in the closed casing 28, and which pipe leads to the bottom of the hot water tank, and opens the end 101 of pipe 30, which leads to the radiator 31, outside of the building, or for heating space inside a building during the winter season. The object of the radiator 31 is to cool the circulating water in the engine when the water in the tank 19 has become sufficiently heated for the purposes for which it is intended, and, therefore, by this means the magnet 96 will cause the water to circulate from the engine direct to the auxiliary radiator and the water therefrom, becoming cooled, will pass thru the pipe 32 back to the engine thru the pipe 25, thru the hot water pump 16, in the manner heretofore described. Now, when the water in the tank 19 becomes cooled to a predetermined degree, the bellows diaphragm 90 will contract and open the circuit between the lever 91 and the contact 95, whereupon the arm 99 will be returned to the opposite position and close the end 101 of pipe 30 and open the pipe 100, being drawn to this position by the spring 102. In the pipe 30 is a check valve 30', so that the water cannot return from the radiator 31. Should the water in the tank 19 become considerably cooled the bellows diaphragm will contract more than, as heretofore stated, and cause the arm 91 to make electrical connection with the contact 103, thereby energizing the electromagnet 104, which will open a gas valve 105 in the gas pipe 106. A pilot burner 107 is kept lighted under the tank 19, so that when the heat from the engine is not sufficient to supply all of the warm water required in the tank 19 the electromagnet 104 will automatically light the main heating burner 108, under the tank 19. The spring 109 will return the arm, controlled by the magnet 104, to its normal position when the magnet is de-energized.

The liquid fuel for supplying the engine is contained in a tank 110, which may be located in the ground outside of the building on which the plant is situated, and the tank may contain gasoline, kerosene or the like. It is conveyed by a pipe 111 to a vacuum operated secondary tank 112, usual in the operation of engines of this character. The vacuum pipe 113 is connected to the intake manifold 114 of the engine, and the pipe 115 is connected to the carburetor 116. Briefly, the supply of fuel in the tank 112 is produced by the vacuum effect of the inspiration strokes of the engine.

A similar tank 115, is to contain lubricating oil from which the oil is conveyed by a pipe 116, to a similar secondary supply tank 117, operated by vacuum effect through the pipe 118. A pipe 119 connects the lower end of the container 117 with an automatic level-maintaining device 120, shown more clearly in Fig. 3, and operated very similar to the fount in a student lamp, for maintaining a constant level. The outer tank 120 is open at its upper end and encloses a closed tank 121, into which the pipe 119 projects. The bottom of the tank 121 is perforated, as at 122, through which the lubricating oil will pass into the pipe 123, leading into the crank casing of the engine, and also leading into the bearings 124 and 125 of the dynamo. Another pipe 126 returns the used lubricant into the lower part of the crank case, as at 127.

A gauge 128 is used for indicating the level of the lubricant, or fuel, in either of the tanks 110 or 115. The indicator 128 is provided with a tube 129, containing a square or angular rod 130. A slide 131 on the rod has a projection 132 that extends into a spiral groove 133, made on the inside of the tube 129. A float 134 is connected to the part 131 and moves upwardly with it, when the tank is being filled. As the fuel or lubricant is used out of the tank, the float 134, with its weighted end 131, will descend in the tube 129, and always remain upon the top of the liquid. The projection 132 that extends into the groove 131 will rotate the rod 130 as it descends, and the index 135 will pass around over the top of the graduated scale 136, at the top of the instrument, and indicate the extent to which the tank is filled. After the index 135 has made a complete revolution, indicating that the tank is empty, it will bear upon a spring 138 and break connection with the contact 139. The part 140, of the index, will press against the spring 138, thereby opening the circuit between the wire 70 and the contact 71, and causing the engine to stop and prevent engine from being cranked by the battery and furthermore the engine cannot be started unless the index 135 is out of contact with the spring 138, which indicates that there is a supply of fuel or lubricant within the respective tanks.

While I have shown the battery cell 66 separated from the main battery B, it will be manifest, to a person skilled in the art, that it is shown in this way for the simple purpose of illustration, as it belongs, in practice, at the end of the series of cells illustrated above, in which it is specifically indicated by the reference character 66.

While I have herein shown a single exemplification of my invention for the purpose of clear disclosure, it will be manifest, to persons skilled in the art, that numerous changes may be made in the general arrangement and configuration of the parts, within the scope of the appended claims.

Having described my invention, what I claim as new, and for which I desire to secure Letters Patent, is:—

1. A system for supplying hot water from a plant operated by an internal combustion engine, comprising two reservoirs connected to the jacket of the engine; means to pass the water from the jacket to said reservoirs; temperature and pressure responsive means for closing communication with one reservoir and for opening communication with the other reservoir and a pipe to return the water from either reservoir to the jacket.

2. A system for supplying hot water from a plant operated by an internal combustion engine comprising two reservoirs connected to the jacket of the engine by parallel pipes and a common return pipe and means responsive to the temperature of the water to disconnect one reservoir from the return pipe and to connect the other reservoir thereto and another means to heat the water in the latter reservoir also controlled by the temperature responsive device.

3. A system of the character described, having in combinative association, an internal combustion engine, with a water cooling jacket; a tank, connected to the jacket; a pump, driven by the engine to pass water thru the jacket into the tank; a temperature-responsive device, connected to said water circulating system, and a valve, controlled by said responsive device, to divert water from the circulating system upon a predetermined rise in temperature therein and other means to heat the water in said tank controlled by said responsive device.

In testimony whereof I hereunto subscribe my name.

VINCENT G. APPLE.